United States Patent [19]

Bhatti et al.

[11] 4,404,009
[45] Sep. 13, 1983

[54] METHOD AND APPARATUS FOR FORMING GLASS FIBERS

[75] Inventors: Mohinder S. Bhatti; Alfred Marzocchi; George W. Ritter, all of Newark, Ohio

[73] Assignee: Owens-Corning Fiberglas Corporation, Toledo, Ohio

[21] Appl. No.: 452,274

[22] Filed: Dec. 22, 1982

[51] Int. Cl.³ .......................................... C03B 37/025
[52] U.S. Cl. ............................................... 65/1; 65/2; 65/374.12
[58] Field of Search ............................ 65/1, 2, 374.12

[56] References Cited

U.S. PATENT DOCUMENTS

| | | | |
|---|---|---|---|
| 2,555,372 | 6/1951 | Ramage | 204/38 |
| 2,777,254 | 1/1957 | Siefert et al. | |
| 3,132,928 | 5/1964 | Crooks et al. | 29/198 |
| 3,134,659 | 5/1964 | Labino | 65/2 |
| 3,147,547 | 9/1964 | Kuebrich et al. | 29/528 |
| 3,157,482 | 11/1964 | Nero et al. | 65/17 |
| 3,206,846 | 9/1965 | Slayter et al. | 29/470 |
| 3,235,646 | 2/1966 | Sens | 13/6 |
| 3,248,190 | 4/1966 | Woodward et al. | 65/1 |
| 3,371,409 | 3/1968 | Bonnet et al. | 29/528 |
| 3,461,058 | 12/1969 | Westfield et al. | 204/290 |
| 3,480,523 | 11/1969 | Tyrrell | 204/43 |
| 3,511,306 | 5/1970 | Warkoczewski | 65/15 |
| 3,518,066 | 6/1970 | Bronnes et al. | 29/195 |
| 3,657,784 | 4/1972 | Selman et al. | 29/195 |
| 3,736,109 | 5/1973 | Darling et al. | 29/195 |
| 3,741,735 | 6/1973 | Buttle | 29/198 |
| 3,827,953 | 8/1974 | Haldeman | 204/37 R |
| 3,875,028 | 4/1975 | Atlee et al. | 204/37 R |
| 3,947,333 | 3/1976 | Bianchi et al. | 204/129 |
| 3,971,646 | 7/1976 | Rhodes | 65/157 |
| 3,973,920 | 8/1976 | Tadokoro et al. | 29/194 |
| 4,036,601 | 7/1977 | Weimor et al. | 428/663 |
| 4,066,864 | 1/1978 | Heitmann | 219/121 EM |
| 4,105,828 | 8/1978 | Borchert et al. | 428/665 |
| 4,140,507 | 2/1979 | Costin et al. | 65/2 |
| 4,326,871 | 4/1982 | Harris | 65/12 |

FOREIGN PATENT DOCUMENTS

| | | | |
|---|---|---|---|
| 1033627 | 6/1966 | United Kingdom | 65/1 |
| 1242921 | 8/1971 | United Kingdom | 65/1 |

OTHER PUBLICATIONS

Hot Isostatic Processing, MC1C-77-34, Battele Labs., Columbus, Ohio, Nov. 1977, pp. 1-99.

*Primary Examiner*—Robert L. Lindsay, Jr.
*Attorney, Agent, or Firm*—Ronald C. Hudgens; Robert F. Rywalski; Greg Dziegielewski

[57] ABSTRACT

A feeder for supplying molten streams of glass to be attenuated into fibers is provided comprising a refractory metal core; an oxygen impervious, precious metal sheath and an intermediate diffusion barrier layer intimately bonded together by hot isostatic pressing to form a unitary laminate, said laminate having inserts having orifices extending therethrough adapted to establish streams of molten material for attenuation into filaments.

10 Claims, 4 Drawing Figures

METHOD AND APPARATUS FOR FORMING GLASS FIBERS

TECHNICAL FIELD

The invention disclosed herein relates to a glass fiber forming feeder having at least one laminated wall comprised of a refractory metal substrate; an oyxgen impervious, precious metal sheath; and an intermediate layer intimately bonded together by hot isostatically pressing to form a unitary laminate wherein the intermediate layer substantially retards the interdiffusion of the substrate and sheath.

BACKGROUND ART

There has been a long-felt need to produce a long lasting feeder for flowing streams of molten inorganic material, such as glass, at operating temperatures equal to or higher than currently practiced.

Much of the previous work was directed to forming alloys having superior properties over the unalloyed metals. Feeders in the textile art, or fixed bushing art, have historically been made from alloys of platinum and rhodium. Feeders in the wool art, or rotatable feeders, have been produced employing Cobalt based alloys.

The present invention provides inorganic fiber forming feeders wherein the high temperature strength characteristics of refractory metals are combined with the oxidation resistance of precious metals in combination with an intermediate diffusion barrier layer to substantially retard or eliminate the interdiffusion between the refractory metal and the precious metal to produce feeders capable of operating at high temperatures and for extended periods of time heretofore.

DISCLOSURE OF THE INVENTION

This invention pertains to a laminated wall for a feeder for supplying molten streams of inorganic material to be attenuated into filaments comprising a refractory metal layer; an oxygen impervious precious metal layer; and an intermediate layer intimately bonded together by hot isostatic pressing to form a unitary laminate wherein said intermediate layer substantially retards or eliminates the interdiffusion of the refractory metal layer and the precious metal layer.

BEST MODE OF CARRYING OUT THE INVENTION

Figure 1:
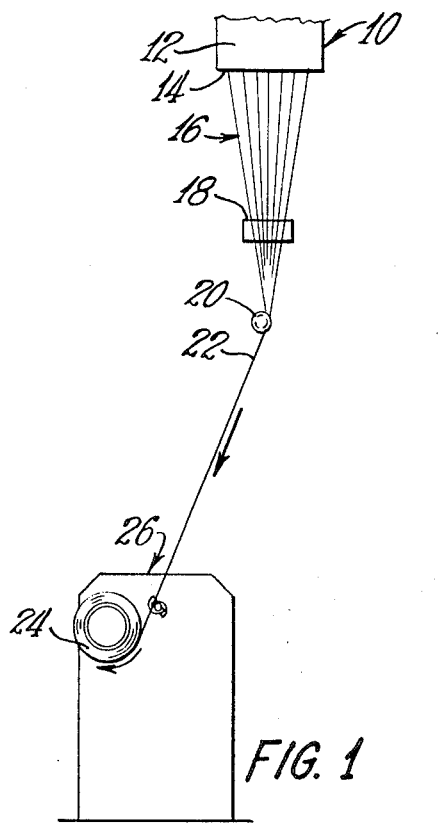
FIG. 1 is a semi-schematic front elevational view of a glass textile type fiber forming system.

As shown in FIG. 1, feeder 10, which is comprised of containment or sidewalls 12 and a bottom discharge wall 14, is electrically energizable to heat the inorganic material to provide a plurality of streams of molten inorganic material, such as glass, in filament formable condition. The streams of molten glass are attenuated into filaments 16 through the action of winder 26.

As is known in the art, size applicator means 18 is adapted to provide a coating or sizing material to the surface of the glass filaments which advance to gathering shoe or means 20 to be gathered into a strand or bundle 22. Strand 22 is then wound into package 24 upon a collet of winder 26. Thus, FIG. 1 schematically represents a "textile" fiber forming system.

Figure 2:
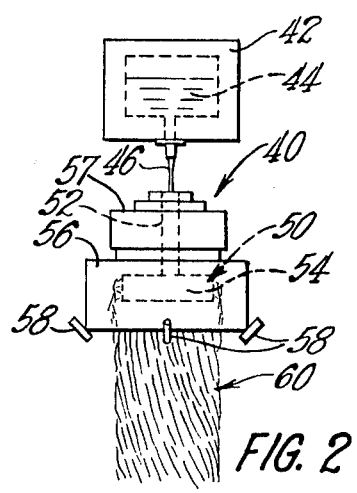
FIG. 2 is a semi-schematic front elevational view of a glass wool or rotary fiber forming system.

As shown in FIG. 2, rotary system 40 is comprised of a flow means or channel 42 having a body of molten inorganic material 44, such as glass, therein. a stream of molten glass 46 is supplied to rotary feeder or rotor 50 from channel 42, as is known in the art.

Rotor 50, which is adapted to be rotated at high speeds, is comprised of a quill 52 and a circumferential discharge wall 54 formed according to the principles of this invention having a plurality of orifices or passageways therethrough adapted to supply a plurality of streams of molten inorganic material to be fiberized.

In conjunction with rotor 50, a shroud 56 and circumferential blower or fluidic attenuation means 57 are adapted to fluidically assist in the attenuation of the streams of molten material into fibers or filaments 60. A binder material or coating may be applied to fibers 60 by means of binder applicators 58, as is known in the art.

With the precious metal layer intimately bonded directly to the refractory metal layer, a potentially undesirable "interdiffusion zone" of complex intermetallic compounds and the like can form as the refractory metal and precious metal diffuse into each other. Such intermetallic compounds may be extremely brittle and/or they may exhibit poor oxidation resistance and the like. The rate of such diffusion is a function of, among other things, time and temperature.

With the incorporation of a "diffusion barrier" of a compatible, stable compound, the service life of the laminate may be extended by retarding or even eliminating the growth of the interdiffusion zone or intermetallic compounds. As shown in the drawings, the discharge walls 14 and 54 of the feeders 10 and 50 are based upon a unitary laminate comprised of a refractory metal layer; an oxygen impervious, precious metal layer; and a barrier layer positioned between the refractory metal layer and the precious metal layer intimately bonded together by hot isostatic pressing to form the unitary laminated discharge wall.

Particularly, such refractory metals are selected from the group of materials consisting of molybdenum (Mo), columbium (Cb), tungsten (W), rhenium (Re), tantalum (Ta), hafnium (hf), titanium (Ti), chromium (Cr), zirconium (Zr), vanadium (V) and base alloys of such refractory metals, such as an alloy of molybdenum, titanium and zirconium, known as TZM.

Particularly, the precious metals are selected from a group consisting of platinum (Pt), palladium (Pd), iridium (Ir), osmium (Os), rhodium (Rh), ruthenium (Ru), and alloys based on such metals, Included in the platinum alloys are H alloy and J alloy which are alloys of platinum and rhodium of 90%/10% and 75%/25% composition, respectively.

The barrier layer should be a stable compound at the desired operating temperatures and should be compatible with the refractory metal layer and the precious metal layer. Also, the refractory metal and/or the precious metal should not form a compound with the materials of the barrier layer having a softening or melting temperature less than the temperature of the intended operating range of the fiber forming feeder, that is, generally about the temperature of the molten glass in contact with the laminate. Reference to phase diagrams for compounds formed from the various component elements of the layers can indicate which layer materials are acceptable for a given temperature range. Further, the product of the coefficient of expansion and the modulus of elasticity for each of the layers should be generally equal to provide a laminate that resists delamination.

Particularly, the barrier layers are selected from the group consisting of $Al_2O_3$, $MgAl_2O_4$, $MgCr_2O_4$, $TiB_2$, TiC and $MoSi_2$. The corresponding names of such barrier compounds are alumina, magnesium aluminate, magnesium orthochromate, or titanium diboride, titanium carbide, and molybdenum disilicide respectively. The compounds TiC, $Al_2O_3$, $MgAl_2O_4$ and $MgCr_2O_4$ are readily compatible with refractory metal cores of TZM and precious metal sheaths of Pt/Rh alloy, while compounds $TiB_2$ and $MoSi_2$ are generally not, since Boron or Silicon form a compound with platinum having a melting point less than the temperature of the molten glass and thus the feeders in conventional operations.

In the production of such laminates, the barrier layer may be applied to the refractory metal layer or precious metal layer by any suitable means such as plasma spraying, sputtering, vapor-deposition, electrodeposition, hot dipping and the like, with plasma spraying being preferred. Of course, the refractory metal and precious metal surfaces should be free of dust, grit and/or organic matter and the like prior to coating and assembly. Such diffusion barrier layers have been found to be effective when applied in thicknesses as little as 1 to 15 mils.

Figure 3:
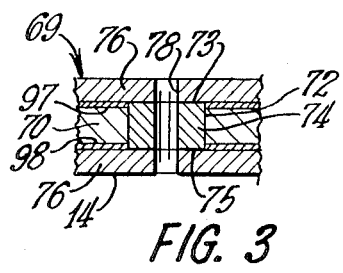
FIG. 3 is an enlarged cross sectional view of orificed walls of stream feeders of the type shown in FIGS. 1 and 2.
Figure 4:
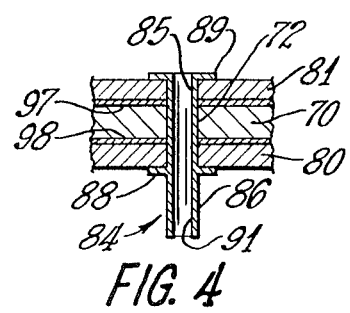
FIG. 4 is an enlarged cross sectional view of a cross section of another feeder wall having a hollow tubular member inserted therethrough.

When fabricating a fully sheathed core as shown in FIGS. 3 and 4, it is generally easier to apply the diffusion barrier compound to the entire surface of the refractory metal core and form the precious metal sheath to the contour of the coated core. With the coated core inserted in the precious metal sheath, the sheath can be then out-gassed and sealed to prepare it for the hot isostatic pressing step. With the simultaneous application of heat and pressure of the hot isostatic pressing step, the layers are then intimately bonded together to form a unitary laminate capable of service in oxidizing, high temperature environments such as in contact with molten glass and air.

As shown in FIG. 3, bottom wall 14 is comprised of a laminate 69 adapted to flow molten glass through orifice 78. As such, core or substrate 70, having a suitable barrier layer sections 97 and 98 applied thereto, is provided with a plurality of apertures 72 therethrough by any suitable means, such as drilling. Preferably, the apertures are formed in core 70 subsequent to the application of the barrier layer, but the apertures may be formed in the core prior to applying the barrier layer, if desired.

An insert or element 74 is positioned in or press fit into each of the apertures 72 in core 70. To ensure a snug fit between the element 74 and core 70, a press fit is preferred. The planar end surfaces 73 and 75 of element 74 should be substantially flush or coplanar with the planar surfaces of the core 70. That is, preferably, the plugs are formed having an axial height substantially equal to the thickness of core 70 including the thickness of the diffusion barrier which appears as layers 97 and 98 between core 70 and sheath 76. Each element can be a cylindrically shaped solid plug of precious metal adapted to snugly fit within each aperture 72.

Then the unit is hot isostatically pressed to form a unitary laminate 69 having superior high temperature strength and creep characteristics capable of functioning in an oxidizing atmosphere at elevated temperatures, for example temperatures above 1000° C., such as encountered in the fiberization of glass filaments.

As shown in FIG. 3, end surfaces 73 and 75 of each element or plug 74 are intimately bonded to the interior surfaces of sheath 76 after HIP'ing.

At least one orifice 78 to establish a stream of molten glass is formed through element 74, preferably, without exposing any of the refractory metal core 70 to form discharge wall 14. Wall 14 can be combined with sidewalls 12 to form a textile type feeder 10 having a tipless bottom wall. Or, a hollow tubular member or tip can be attached to the laminate 69 to form a "tip-type" discharge wall. Preferably, the hollow tubular member and element 74 are also formed of one of the aforementioned precious metals or base alloys thereof, such as platinum.

As shown in FIG. 4, laminate 69 is comprised of refractory metal core or substrate 70 first precious metal layer 80; second precious metal layer 81; first diffusion barrier layer 97 and second diffusion barrier layer 98 intimately bonded together to form a unitary laminated article.

A plurality of apertures are formed in laminate 69 to provide a fiber forming feeder having the capability to provide a plurality of molten streams of glass to be attenuated into filaments. Preferably, the apertures are formed in laminate 69 subsequent to the HIP'ing process to form laminate 69.

As shown, tubular member 84 is positioned in aperture 72 such that first flange 88 and second flange 89 are sealed to precious metal layers 80 and 81 respectively. Projection 86 of sleeve 85 extends outwardly beyond layer 80 to form an "orificed tip". As such, the protective insert in aperture 72 and projecting "tip" are formed from the same tubular element.

Tubular member 84 may be joined to laminate 69 by a suitable means, including hot or cold isostatic pressing as disclosed in copending U.S. patent applications Ser. No. 378,663 filed on May 17, 1982 in the name of Mohinder S. Bhatti; and Ser. No. 398,536 filed on July 15, 1982 in the name of Mohinder S. Bhatti or as disclosed in concurrently filed application Ser. No. 452,273 filed on Dec. 22, 1982 in the name of Mohinder S. Bhatti all of which are hereby incorporated by reference.

It is apparent that within the scope of the invention, modifications and different arrangements can be made other than as herein disclosed. The present disclosure is merely illustrative with the invention comprehending all variations thereof.

INDUSTRIAL APPLICABILITY

The invention disclosed herein is readily applicable to the glass fiber industry.

We claim:

1. A feeder for supplying streams of glass to be drawn into filaments having an orificed wall comprising:
a refractory metal layer;
an oxygen impervious, precious metal layer;
a barrier layer located between said refractory metal layer and said precious metal layer, said layers being intimately bonded together by hot isostatic pressing to form a unitary laminate, said barrier layer substantially retarding the interdiffusion of the refractory metal and precious metal; said refractory metal or precious metal not forming a compound with said barrier layer having a melting point temperature less than the temperature of the molten glass in contact with said laminate; said laminate having at least one aperture therethrough; and an orificed element positioned in said aperture to prevent the oxidation of said refractory metal layer at elevated temperatures and to establish said streams of glass.

2. The feeder of claim 1 wherein said barrier layer is a material selected from the group consisting of $Al_2O_3$, $MgAl_2O_4$, $MgCr_2O_4$, $TiB_2$, TiC and $MoSi_2$.

3. The feeder of claim 2 wherein the refractory metal layer is selected from the group consisting of Ti, V, Cb, Ta, Cr, Mo, W, Re and base alloys thereof and wherein said precious metal layer is selected from the group consisting of Pt, Pd, Ir, Os, Rh, Ru and base alloys thereof.

4. The feeder of claim 1 wherein said refractory metal layer is an alloy of Mo, Ti and Zr; said precious metal layer is an alloy of Pt and Rh; and said barrier layer is a material selected from the group consisting of TiC, $Al_2O_3$, $MgAl_2O_4$ and $MgCr_2O_4$.

5. The feeder of claim 4 wherein said element is made from an alloy of Pt and Rh.

6. The method of forming a laminated wall for an inorganic fiber forming feeder comprising:

positioning a barrier layer between a refractory metal layer and an oxygen impervious, precious metal layer to form an assembly;

hot isostatically pressing the assembly to intimately bond said layers together to form a unitary laminate, said barrier layer being effective to substantially retard the interdiffusion of the refractory metal and the precious metal; said refractory metal or said precious metal not forming a compound with the material of said barrier layer having a melting point temperature less than the temperature of the molten materal to be in contact with said laminate;

forming at least one aperture in said laminate; and providing an element in the aperture to protect said refractory metal core at elevated temperatures, said element having an orifice therethrough adapted to permit the molten material to issue therefrom as stream for attenuation into a fiber.

7. The method of claim 6 wherein said barrier layer is a material selected from the group consisting of $Al_2O_3$, $MgAl_2O_4$ $MgCr_2O_4$, $TiB_2$, TiC and $MoSi_2$.

8. The method of claim 7 wherein the refractory metal layer is selected from the group consisting of Ti, V, Cb, Ta, Cr, Mo, W, Re and base alloys thereof and wherein said precious metal layer is selected from the group consisting of Pt, Pd, Ir, Os, Rh, Ru and base alloys thereof.

9. A feeder produced according to the method of claim 6.

10. The method of forming glass fibers comprising:

providing a feeder having an orificed wall formed by positioning a barrier layer between a refractory metal layer and an oxygen impervious, precious metal layer to form an assembly;

hot isostatically pressing the assembly to intimately bond said layers together to form a unitary laminate, said barrier layer being effective to substantially retard the interdiffusion of the refractory metal and the precious metal; said refractory metal or said precious metal not forming a compound with the material of said barrier layer having a melting point temperature less than the temperature of the molten glass in contact with said laminate;

forming a plurality of apertures in said laminate;

providing an element in the apertures to protect said refractory metal layer at fiber forming temperatures, said elements having an orifice therethrough adapted to permit the molten glass to issue therefrom as stream;

flowing molten streams of glass from said feeder; and drawing said streams into filaments.

* * * * *